United States Patent [19]

Kafka et al.

[11] Patent Number: 5,365,366
[45] Date of Patent: Nov. 15, 1994

[54] SYNCHRONOUSLY PUMPED SUB-PICOSECOND OPTICAL PARAMETRIC OSCILLATOR

[75] Inventors: James D. Kafka, Mountain View; Michael L. Watts, Union City; Jan-Willem J. Pieterse, Sunnyvale; Kevin K. Holsinger, Menlo Park, all of Calif.

[73] Assignee: Spectra-Physics Lasers, Inc., Mountain View, Calif.

[21] Appl. No.: 58,743

[22] Filed: Apr. 29, 1993

[51] Int. Cl.$^5$ .............................. H03F 7/00; H01S 3/10
[52] U.S. Cl. ......................... 359/330; 359/328; 372/22; 372/21; 372/72; 372/71
[58] Field of Search .................. 359/330, 328; 372/21, 372/22, 72, 69, 71

[56] References Cited

U.S. PATENT DOCUMENTS

| | | | |
|---|---|---|---|
| 5,017,806 | 5/1991 | Edelstein et al. | 359/330 |
| 5,134,622 | 7/1992 | Deacon | 372/21 |
| 5,144,630 | 9/1992 | Lin | 372/22 |
| 5,159,487 | 10/1992 | Geiger et al. | 359/330 |
| 5,206,868 | 4/1993 | Deacon | 372/21 |

FOREIGN PATENT DOCUMENTS 0067131 3/1992 Japan ........................ 359/330

Primary Examiner—Georgia Y. Epps
Attorney, Agent, or Firm—Haynes & Davis

[57] ABSTRACT

A synchronously pumped optical parametric oscillator (OPO) using a temperature-tuned 90° phase matched LBO crystal is disclosed which provides a broad selection of output wavelengths. A Ti:Sapphire pump source having a cavity length matched to the OPO cavity length pumps a cavity with an LBO crystal located at the cavity waist of the cavity mode.

13 Claims, 4 Drawing Sheets

SYNCHRONOUSLY PUMPED SUB-PICOSECOND OPTICAL PARAMETRIC OSCILLATOR

BACKGROUND OF THE INVENTION

1. Field Of The Invention

The present invention relates to optical parametric oscillators. More particularly, the present invention relates to a synchronously pumped optical parametric oscillator for generating high-power, broadly tunable pulses with subpicosecond duration.

2. The Prior Art

Optical parametric oscillators (OPO) have been known for many years. Recently, cw mode-locked OPO's have been demonstrated. The first system was demonstrated by E. S Wachtman, D. C. Edelstein, and C. L. Tang, *Opt. Lett.* 15, 136 (1990) and used a CPM laser as the pump source. The nonlinear crystal was KTiOPO$_4$ (KTP) which has the highest nonlinear coefficient of any suitable crystal and thus the greatest chance of reaching threshold. To obtain sufficient pump power the KTP crystal was placed both inside an OPO cavity and inside the CPM cavity. This increased the pump power by two orders of magnitude and greatly increased the complexity of the system. U.S. Pat. No. 5,017,806 discloses much the same system as described in the Edelstein et al. article. The wavelength of the OPO is adjusted by rotation of the crystal.

Recently, cw mode-locked Ti:sapphire lasers have been demonstrated. These lasers are capable of reaching the same peak powers outside the cavity as inside the CPM laser and are thus useful as pump sources. The average power output of a low mode-looked Ti:sapphire laser is typically 1 to 2 Watts, with a pulse duration of about 100 femtoseconds. KTP OPO's using this pump source have been demonstrated by several groups. Q. Fu, G. Mak, and H. M. van Driel, *Opt. Lett.* 17, 1006 (1992) used 110 femtosecond pump pulses and angle-tuned KTP to produce tunable sub-picosecond pulses. W. S. Pelough, P. E. Powers, and C. L. Tang, *Opt. Lett.* 17, 1070 (1992) obtained similar results using 125 femtosecond pump pulses and angle tuned KTP.

A. Nebel, U. Socha, and R. Beigang, in *Digest of Conference on Ultrafast Phenomena VIII*, (E.N.S.T.A. Paris 1992) paper ThC1, used a 1.4 picosecond Ti:sapphire laser and a 90° phase matched KTP crystal to produce tunable picosecond pulses. This crystal configuration has several advantages over the angle tuned system, in that the nonlinear coefficient is maximum and there is no walkoff. Both of these attributes contribute to a more efficient OPO with potentially higher output power. In addition because of the lack of walkoff (between the pump beam and the OPO beam) the alignment procedure can be made significantly simpler than in the angle tuned systems. One drawback, however, is that the crystal can no longer be rotated to tune the output. The output of the pump laser had to be tuned in order to tune the output.

The angle-tuned KTP systems have several drawbacks. When the OPO is tuned, the crystal is rotated. The cavity length must then be adjusted and the cavity must be realigned after rotation of the crystal. To obtain the widest possible tuning range, multiple crystals may be necessary due to the AR coatings required. The alignment is complicated because the pump beam and OPO beam are not collinear. This walkoff requires the pump beam to be brought in at a specified angle to the OPO beam. The beams must also be focussed to less than 50 microns and cross in the nonlinear crystal.

Using 90° phase matched KTP removes the walkoff problem and simplifies the alignment. The pump laser must be tuned, however, and then the dispersion of the pump laser must be adjusted. Then the OPO cavity length needs to be reoptimized. In addition, multiple sets of optics are required for the pump laser. Even with these additional optics sets, the tuning range of the OPO is limited, and a region of non-coverage exists between 1.5 and 2.2 microns. In addition, the output power will drop severely at longer wavelengths due to the drop in pump power.

The only nonlinear crystal other than KTP which has been successfully demonstrated in a cw synchronously pumped OPO is LiB$_3$O$_5$ (LBO). A. Robertson, G. P. A. Malcolm, M. Ebrahimzadeh, and A. I. Ferguson, Post-deadline paper CPD15 from CLEO 1992, demonstrated an LBO OPO utilizing a 2.5 picosecond pulse at 524 nm from a frequency-doubled, mode-locked Nd:YLF laser as the pump source. They generated picosecond pulses using 90° phase-matched LBO and used temperature tuning to tune the output. The crystal length was 12 mm and the authors state that it should be possible to generate femtosecond pulses by using a pulse-compressed pump source.

The 90° phase matched LBO crystal has all the advantages of 90° phase matched KTP with the added advantage of temperature tuning. In particular, only the temperature and the cavity length need to be adjusted to tune the OPO. In the case of angle tuned OPO's, the cavity must also be realigned slightly if the OPO is tuned over any significant wavelength difference. Unfortunately the change in index of LBO with respect to temperature is not a well known quantity yet. The only published data is in S. P. Velsko, M. Webb, L. Davis and C. Huang, *IEEE J. Quantum Electron.* 27, 82 (1991); and S. Lin, J. Y. Huang, J. Ling, C. Chen, and Y. R. Shen, *Appl. Phys. Lett.* 59, 2805 (1991). This data from these papers is contradictory and does not accurately predict the observed performance. Whether the LBO crystal would work with a Ti:sapphire pump at 800 nm at a reasonable temperature (less than 200° C.) was not known and cannot be predicted from the literature. This is why Robertson teaches to compress the 524 nm source as opposed to switching to a Ti:sapphire pump. It is widely believed that the crystal temperature would be too hot for 800 nm pumping.

It is an object of this invention to provide an OPO which can generate broadly tunable pulses with sub-picosecond duration.

A further object of the invention is to provide an OPO which can produce the highest power and shortest pulses from a simple and reliable system.

Yet another object of the present invention is to provide an OPO which overcomes the drawbacks of prior-art OPO systems.

Another object of the invention is to provide an OPO which is easy to align and requires minimum adjustment during tuning.

Still a further object of the invention is to provided an OPO which produces the highest power and shortest pulses over a tuning range larger than that available in present OPO systems.

BRIEF DESCRIPTION OF THE INVENTION

According to the present invention, a synchronously pumped, temperature-tuned 90° phase matched LBO crystal optical parametric oscillator (OPO) is disclosed which provides a broad selection of output wavelengths. A Ti:Sapphire pump source is used.

The inventors have discovered that, contrary to predicted behavior, temperature-tuned 90° phase matched LBO will work well with a Ti:sapphire pump source, and is, in fact, a preferred combination for generating high power, and the shortest pulses from a cw synchronously pumped OPO. The Ti:sapphire laser is the preferred pump source because it is the highest average power source of subpicosecond pulses available today. In addition, 90° phase matched LBO is the best choice for the nonlinear crystal because of ease of alignment and ease of tunability. In addition the wavelength at which the group delay dispersion of 90° phase matched LBO becomes zero is lower than in other materials.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

It is known in the art that most nonlinear crystals do not have sufficient nonlinearity to work in cw synchronously pumped OPO. At present only LBO, BBO and KTP appear to be candidates. Of these only LBO can be used 90° phase matched and temperature tuned. It has been determined that this combination of sub-picosecond pump pulses from a Ti:sapphire laser and 90° phase matched LBO provides a unique source of tunable, high power, sub-picosecond pulses.

Figure 1:
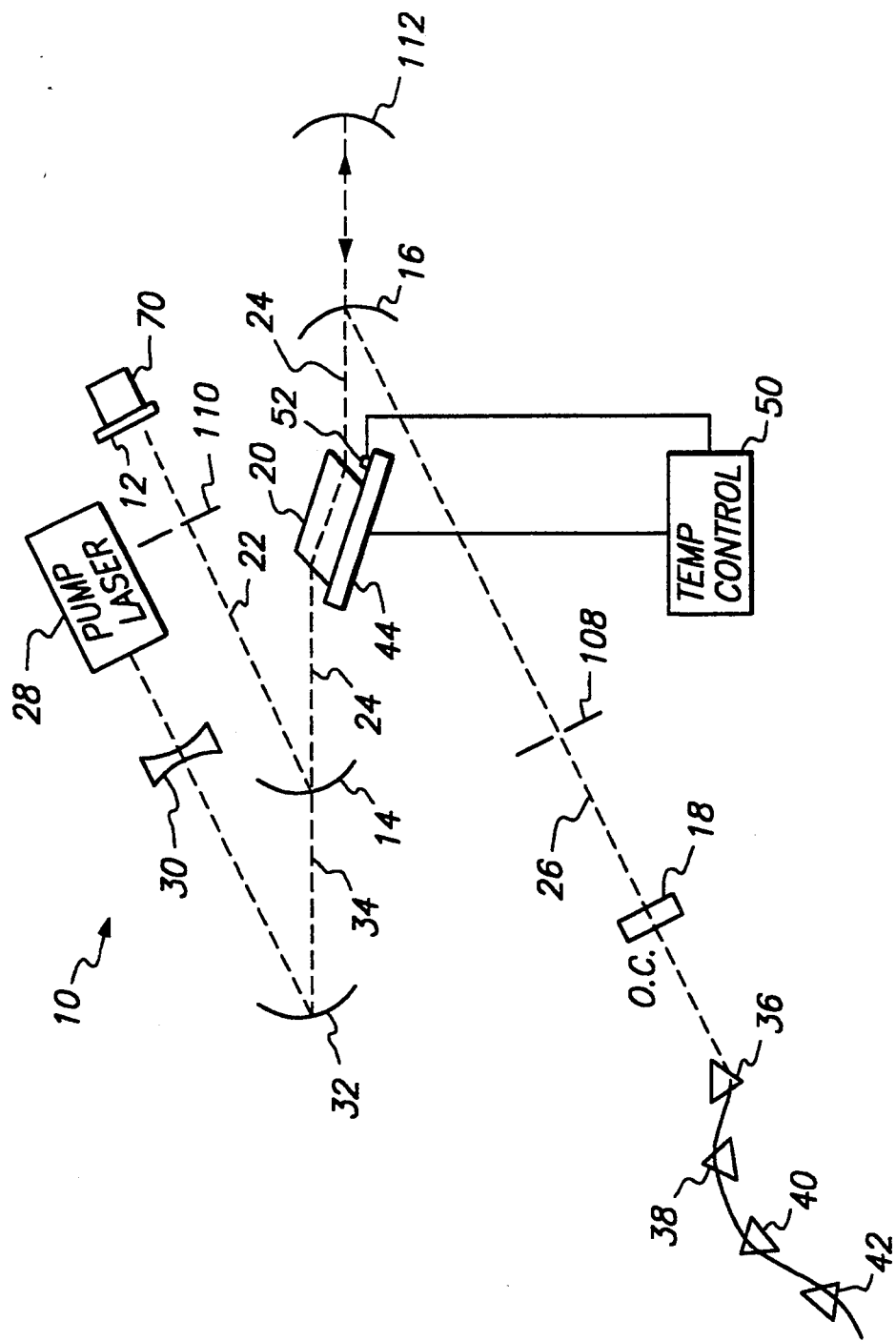
FIG. 1 is a block diagram of a synchronously pumped, temperature-tuned 90° phase matched LBO crystal optical parametric oscillator (OPO) according to a presently preferred embodiment of the invention.

Referring first to FIG. 1, a synchronously pumped, temperature-tuned 90° phase matched LBO crystal optical parametric oscillator (OPO) 10 according to the present invention is shown in block diagram form. A cavity is defined by highly reflective mirror 12, curved mirrors 14 and 16, and output coupler 18. A temperature-tuned 90° phase matched LBO crystal 20 is disposed between curved mirrors 14 and 16.

Highly reflective mirror 12 may be formed on a substrate such as part No. G0324 or G3801, curved mirrors 14 and 16 may be formed on a substrate part No. G0079 and may have curvatures of 10 cm. Output coupler 18 may be formed on a substrate part No. G0324. These substrates are available from the Components and Accessories Group of Spectra-Physics Lasers of Mountain View California. The substrates of mirrors 12, 14, and 16 should be coated so as to be highly reflective from 1.1 to 1.6 microns and may need to be provided as separate sets of optics for different portions of the bandwidth of interest as will be appreciated by those of ordinary skill in the art. Output coupler 18 should be coated to be between about 1% to 10% transmissive at the same wavelengths used for design of the other mirrors.

A three-legged, zig-zag optical path through the cavity as shown by dashed lines through cavity legs bearing reference numerals 22, 24, and 26. The optical path 24 in the center leg of the cavity passes through LBO crystal 20, which is located at the waist of the cavity mode (nominally about 25 microns) and has its faces oriented at Brewster's angle in the preferred embodiment. In an embodiment actually constructed according to the present invention, legs 22 and 26 were about 850 mm in length and central leg 24 was about 100 mm in length. Those of ordinary skill in the art will appreciate that the length of second arm 24 of the cavity will depend on the curvature of the mirrors 14 and 16. Where their curvature is 10 cm, the length of leg 24 will be about 10 cm (100 mm). The cavity round trip time of a pulse in the pump laser should be exactly matched to the round trip time of a pulse in the OPO cavity in order for the pulse in the OPO cavity to experience gain in the LBO crystal during each round trip. This condition will be referred to herein in both the specification and the claims as the synchronous pumping condition. The lengths of legs 22 and 26 are selected so as to provide synchronous pumping of the OPO.

Other lengths for cavity legs 22, 24, and 26, as well as a three-mirror cavity or a ring cavity could be employed so long as the beam waist at the crystal remains small (i.e., about 25 microns) and the total cavity length satisfies the synchronous pumping condition as defined herein. As is known in the art, additional fold mirrors may be employed to fold one or more cavity legs to produce a more physically compact final product. In addition such persons will realize that, as coating technology improves, it may become possible to provide AR coated crystal faces at normal incidence to the beam.

A cw mode-locked Ti:Sapphire pump laser 28 is employed as a pump source. The output radiation of pump laser 28 is directed through lens 30 to curved mirror 32 and then introduced into the cavity along an optical path (designated by the dashed line bearing reference numeral 34) through curved mirror 14, which is transmissive at the pump radiation wavelength in the range of from about 750–820 nm. An embodiment has been fabricated using a lens 30 having a focal length of about −1 meter and using a curved mirror 32 having a curvature of 22.5 cm. The purpose of lens 30 and curved mirror 32 is to focus the pump beam to a size of about 25 microns inside of crystal 20. Optical path 34 is substantially coincident with the optical path throughout the cavity.

It has been observed by others that several different wavelengths are generated in the OPO crystal even though they are not phase matched. The present inventors have observed the second harmonic of the signal at around 550 to 650 nm, and have measured 10 mW of output and pulsewidths of less than 100 femtosecond. The present inventors have also observed sum frequency generation from the pump and the idler in the green and the pump and the signal in the blue. According to one aspect of the present invention, the intensity of these two signals can be greatly enhanced by rotating the polarization of the pump pulses by several degrees. In fact, a nearly continuous band of wavelengths can then be observed across the visible portion of the spectrum when the output coupler is replaced with a high reflector. It should be noted that all of these pulses will be well synchronized to the signal, idler and pump pulses.

Optical parametric generation is related to frequency doubling because they are both $\chi_2$ processes. When a subpicosecond pulse is frequency doubled, the appropriate crystal length must be chosen. There is a tradeoff between pulsewidth and efficiency. A short crystal will preserve the pulsewidth but the conversion efficiency will be low. For example, to frequency double a 100 femtosecond pulse from 800 nm to 400 nm an LBO crystal of less than 1 mm thickness must be used or the output pulsewidth will be broadened. This broadening is due to the group delay dispersion (GDD) of the crystal and cannot be compensated by a prism pair.

For the above reasons, KTP crystals of only 1 mm or, at most, 1.5 mm, have been used in the subpicosecond OPO's demonstrated to date. The inventors have discovered that subpicosecond pulses can be generated in OPO's even with substantially longer crystals. According to a presently preferred embodiment of the invention, the LBO crystal 20 may be between about 2 mm and 15 mm in length and is preferably between about 4 to 6 mm long and has its faces cut at Brewster's angle. Generally, longer crystals are believed to function but are not preferred because the added cost of providing large crystals does not appear to be justified by enhanced performance. The prior art has taught that crystal lengths optimized for picosecond pulses will not be suitable for femtosecond pulses.

Use of longer crystals lowers the threshold and increases the efficiency of the OPO. Using 60 femtosecond pump pulses from the Ti:sapphire pump laser 28, it has been possible to generate 40 femtosecond pulses in the OPO of the present invention using LBO crystals having thicknesses of 2.2 mm, 4 mm and 6 mm. When long crystals (i.e., longer than about 4 mm) are used, The output pulses from the OPO must first be passed through a sequence of prisms 36, 38, 40, and 42, as shown in FIG. 1. As may be seen from FIG. 1, prisms 36, 38, 40, and 42 are oriented at Brewster's angle. The inventors have found that, unlike a single pass through a frequency doubling crystal, the output pulses from the OPO with a thick crystal are substantially linearly chirped. Thus the prism sequence is able to compress the pulses, a result not contemplated by the prior art.

At those wavelengths where the GDD is negative in the OPO, the chirp on the pulse will be negative. This will also be true for idler pulses when the signal pulse has a positive chirp (since the signal and idler will always have chirps of opposite sign). In this case, the prism pair can be adjusted to give positive GDD by inserting the tips of the prisms sufficiently into the beam. Those of ordinary skill in the art will appreciate that a piece of glass, such as SF-10, can be used instead of the prism sequence in this case.

This same discovery can be applied to subpicosecond pulses generation from OPO's using only picosecond pump pulses. Output pulses of 3 picosecond have been generated using 4 picosecond pump pulses at 532 nm and a 6 mm LBO crystal. When these output pulses were passed through a prism sequence such as 36, 38, 40, and 42 of FIG. 1, 200 femtosecond pulses were generated. The inventors believe that the generation of these linearly chirped pulses is due to the GDD in the crystal and cavity and the requirement of satisfying the synchronous pumping condition.

The OPO of the present invention may be temperature tuned over a wide range of wavelengths. Accordingly, the LBO crystal 20 is disposed on a thermoelectric controller 44 which may be used to vary the crystal temperature from about room temperature to about 200° C. Thermoelectric controller 40 may comprise a model 01801-9C30-11A Thermo cooler available from Thermo Electron Technologies of Waltham, Mass. The temperature of the LBO crystal 20 can be controlled and stabilized to better than 1° C., and within at least about 2 degrees C., by using feedback techniques as is well known in the art.

Figure 2:
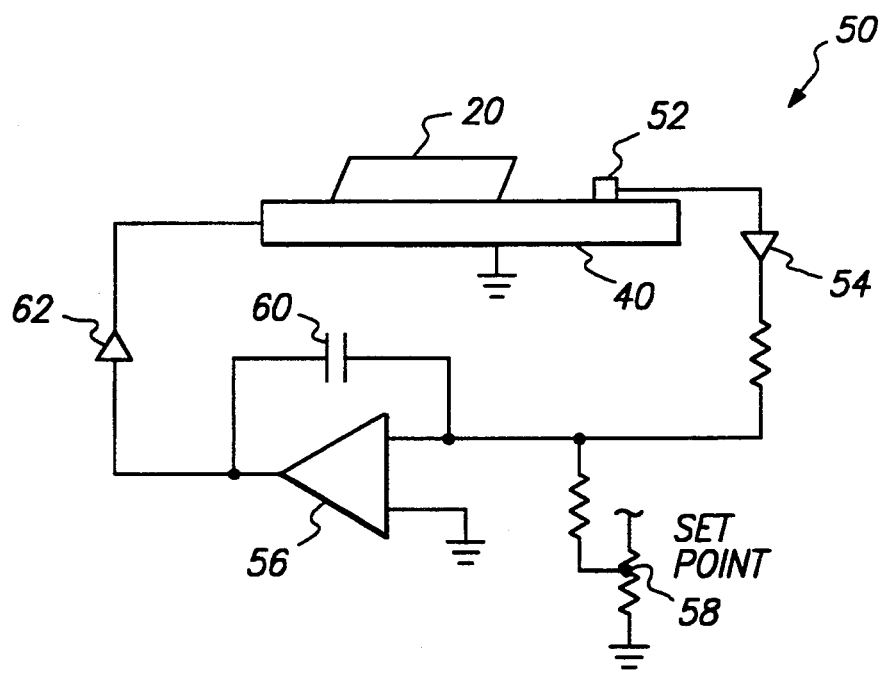
FIG. 2 is a block diagram of a typical temperature feedback arrangement useful to control the temperature of the LBO crystal in the OPO of the present invention.

A typical temperature controller circuit 50 (FIG. 1) useful for the OPO of the present invention is shown in block diagram form in FIG. 2. A temperature sensor 52 is disposed adjacent to crystal 20 on thermoelectric controller 40 and is connected to temperature controller circuit 50. As can be seen in FIG. 2, temperature controller circuit 50 comprises an amplifier 54 coupled to the output of temperature sensor 52. The DC output signal from amplifier 54 is combined in amplifier 56 with a DC setpoint signal from potentiometer 58 (alternatively a DAC could be used), used to select an operating temperature. Capacitor 60 is used to provide loop gain compensation. The output signal from amplifier 60 is fed to driver amplifier 62, which controls the amount of heat generated by thermoelectric controller 40. The operation of circuits such as temperature controller circuit 50 is well known.

Mode-locked Ti:sapphire lasers operate from 700 nm to 1100 nm. The second harmonic of these lasers extends from 350 nm to 550 nm. Those of ordinary skill in the art will appreciate that there is a band of output wavelengths between 550 and 700 nm which is not covered if the fundamental and second harmonic of the pump laser is employed.

If the LBO OPO is extended down to a wavelength of 1.1 microns then the second harmonic of the OPO is able to fill this gap. The output wavelength range of the OPO of the present invention may be extended down to about 1.1 microns by raising the temperature of crystal 20 to as high as about 450° C. However, those of ordinary skill in the art will realize that thermoelectric controller 40 cannot withstand such high temperatures and that an oven may be employed in its place in such embodiments.

Figure 3:
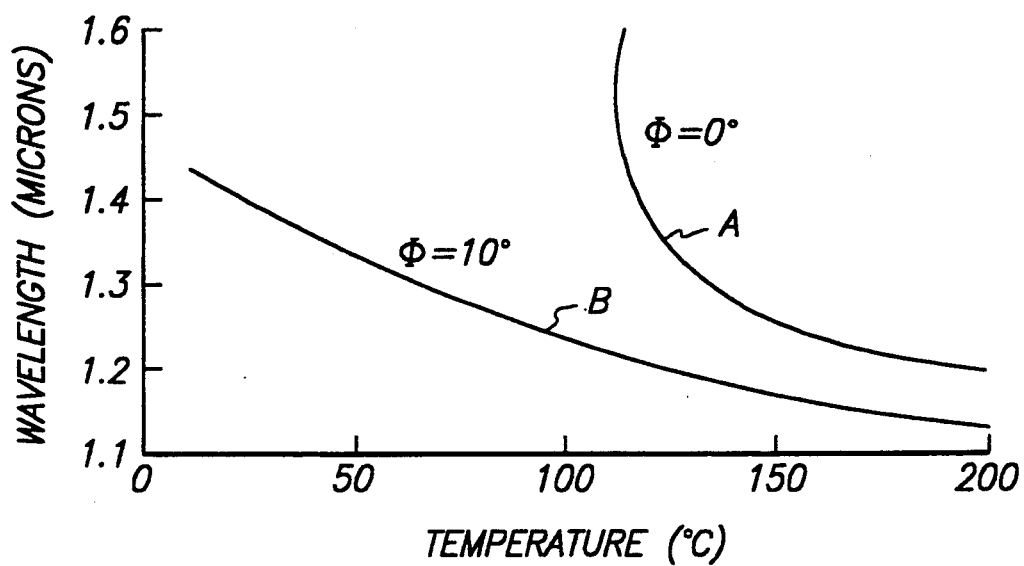
FIG. 3 is a graph showing the dependence of output wavelength on temperature for an LBO crystal cut at two different angles.

Another method for extending the output wavelength range of the OPO of the present invention discovered by the inventors is to tilt the LBO crystal 20 slightly prior to polishing the Brewster faces. A 90° phase matched LBO crystal (also referred to as noncritical phase matching) is always cut at $\theta = 90$ and $\phi = 0$. The phase matching curve for this crystal pumped at a wavelength of 760 nm is shown in curve A of FIG. 3. If instead the crystal is cut at $\theta = 90$ and $\phi = 10°$ the phase matching temperatures shift as shown in curve B of FIG. 3 As is shown, the tuning range of this system will extend down to 1.1 microns. For example, the present inventors have demonstrated that a crystal cut of $\theta=90°$ and $\phi=10°$, when pumped at a wavelength of 750 microns, will produce output pulses at a wavelength of 1.12 microns at a temperature of 165° C. This technique of using a 90° phase matched crystal and tilting away from 0° to broaden the tuning range can, of course, be applied to other crystals, such as KTP and $\phi$ can be less than about 15 degrees.

One goal of the present invention is to provide an OPO which is capable of producing subpicosecond pulses over the wavelength range from 1.1 microns to beyond 2.6 microns. The wavelength at which the OPO runs is determined by the pump wavelength, the temperature of the crystal and to a lesser extent the cavity length of the OPO. The present inventors have modified the temperature coefficients of Lin et al. to obtain a more accurate match to experimental data.

Figure 4:
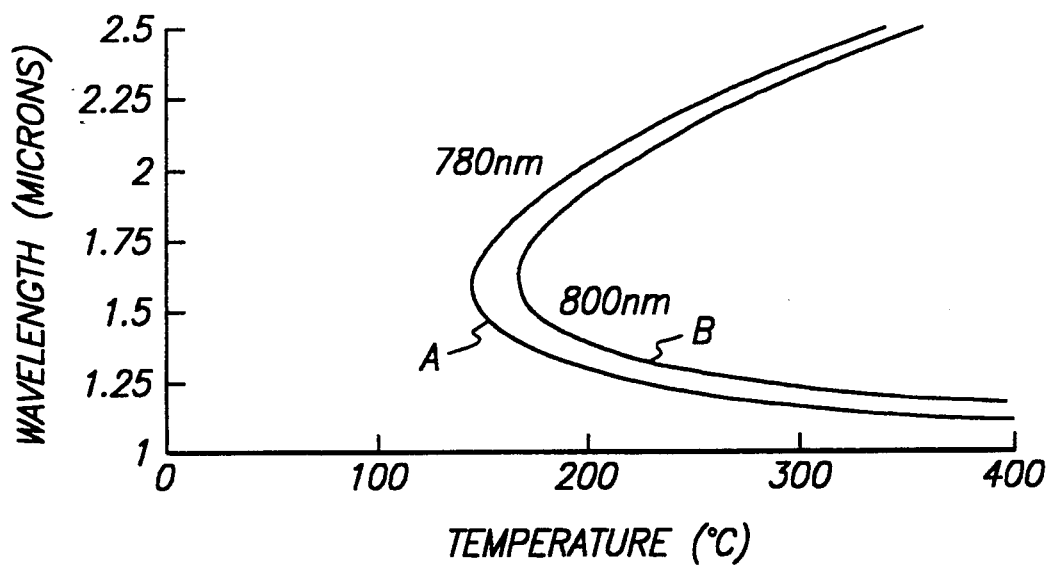
FIG. 4 is a graph showing the dependence of output wavelength on temperature of the OPO of the present invention for two different pump wavelengths.

Referring now to FIG. 4, the dependence of output wavelength on temperature is shown. For a pump wavelength of 780 nm, the phase matching curve shown in curve A of FIG. 4 is obtained. If the laser is tuned to 800 nm, curve B of FIG. 4 is obtained. It is important to note that slope of the curve varies and even becomes infinite at one point. This point is called the degeneracy point and always corresponds to a wavelength that is twice the pump wavelength. Thus the accuracy with which the temperature must be set depends on what wavelength it is desired to generate.

Figure 5:
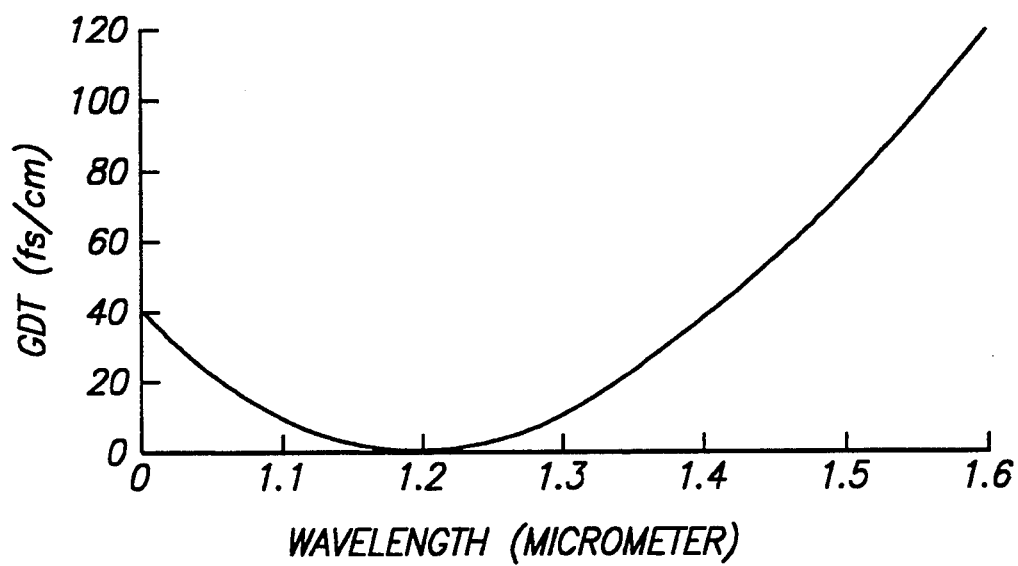
FIG. 5 is a graph showing the approximate group delay time of an LBO crystal as a function of wavelength.

For a given pump wavelength and temperature a band of wavelengths can still operate. Typically, a wavelength within at least 30 nm of the central wavelength predicated by curves A and B of FIG. 4 can still oscillate. Which portion of this band will oscillate is determined by the synchronous pumping condition. When the pulse travels through the cavity it experiences group delay dispersion (GDD), that is the different wavelengths take a different time to make a round trip in the cavity. Most of the GDD comes from the crystal itself. The approximate group delay time of an LBO crystal is shown in FIG. 5. The GDD is then the slope of this curve. Only those wavelengths that satisfy the synchronous pumping condition will oscillate; that is, only those wavelengths that make a round trip in the cavity and return during the 100 femtosecond pump pulse will experience gain. By adjusting the OPO cavity length the OPO can be tuned over tens of nanometers. The sensitivity of the central wavelength to variations in cavity length will depend on the wavelength chosen. Those of ordinary skill in the art will note that, in the region of about 1.2 to 1.3 microns, the GDD becomes zero and the sensitivity to cavity length changes becomes a maximum. This zero GDD point can be moved by inserting other materials into the cavity or by using a prism pair for intracavity dispersion compensation.

According to the present invention, the cavity length of the OPO is servo controlled to keep the OPO cavity and the pump laser cavity at the same length. This is important for generation of pulses having durations less than 100 femtoseconds and for long-term stability. According to a presently preferred embodiment shown in FIG. 6 to which reference is now made, the highly reflective mirror 12 (FIG. 1) (or any fold mirror, if used) may be mounted on a piezoelectric transducer 70, such as an NLA 5×5×9 piezoelectric actuator, available from Tokin Corporation of Tokyo, Japan. Monitored output power is a poor error signal because power decreases whether the cavity is too long or too short. Proper operation of a servo requires an error signal which increases if the cavity is too long or decreases if the cavity is too short (or vice versa).

Such an error signal can be obtained by dithering and synchronous detection. The position of mirror 12, and thus the total cavity length, is dithered at a high frequency (i.e., about 60 KHz) by applying the high frequency output of oscillator 72 to the piezoelectric transducer. A portion of the output signal (shown at reference numeral 74) is directed to a detector 76 by a beam splitter 78. The detected signal is amplified by amplifier 80 and then synchronously detected by analog multiplier 82 and low pass filter 84 or other known synchronous detection circuitry. After this, amplifier 86 provides loop gain compensation as in any servo system. The output of amplifier 86 supplies a DC signal defining the rest position of the piezoelectric transducer 70, which is added to the dithering signal in adding circuit 88 and buffered by piezo driver amplifier 90. One drawback of this technique is that it will stabilize the output power but will not stabilize the wavelength.

Figure 6:
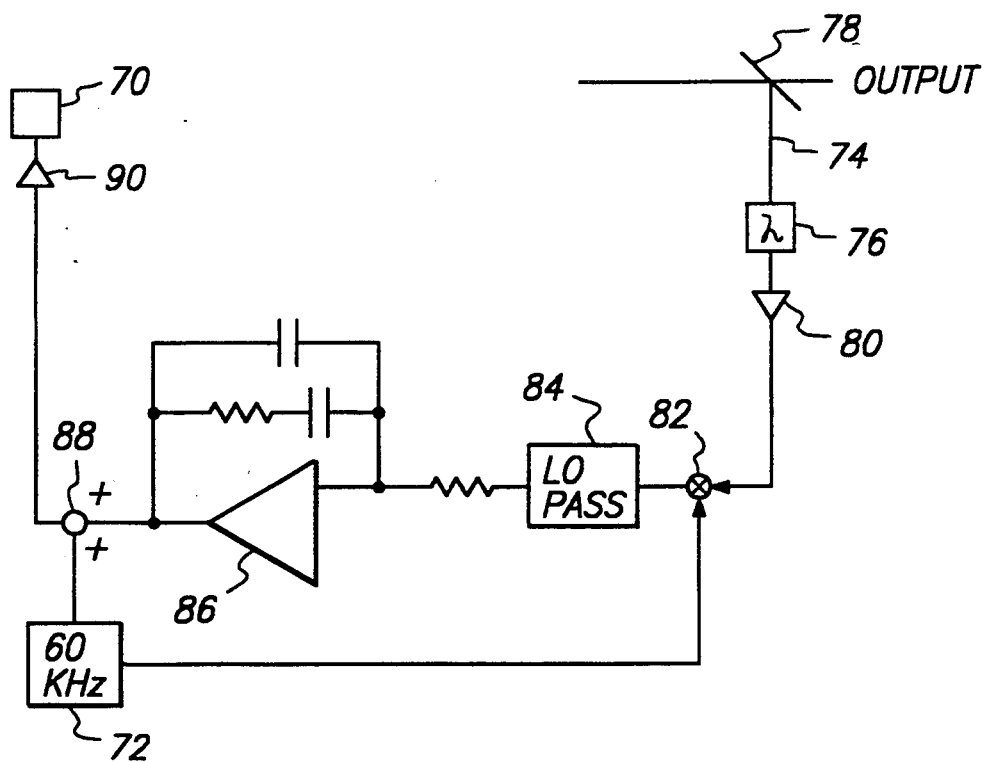
FIG. 6 is a block diagram of a first embodiment of a cavity-length servo control for the OPO of the present invention.
Figure 7:
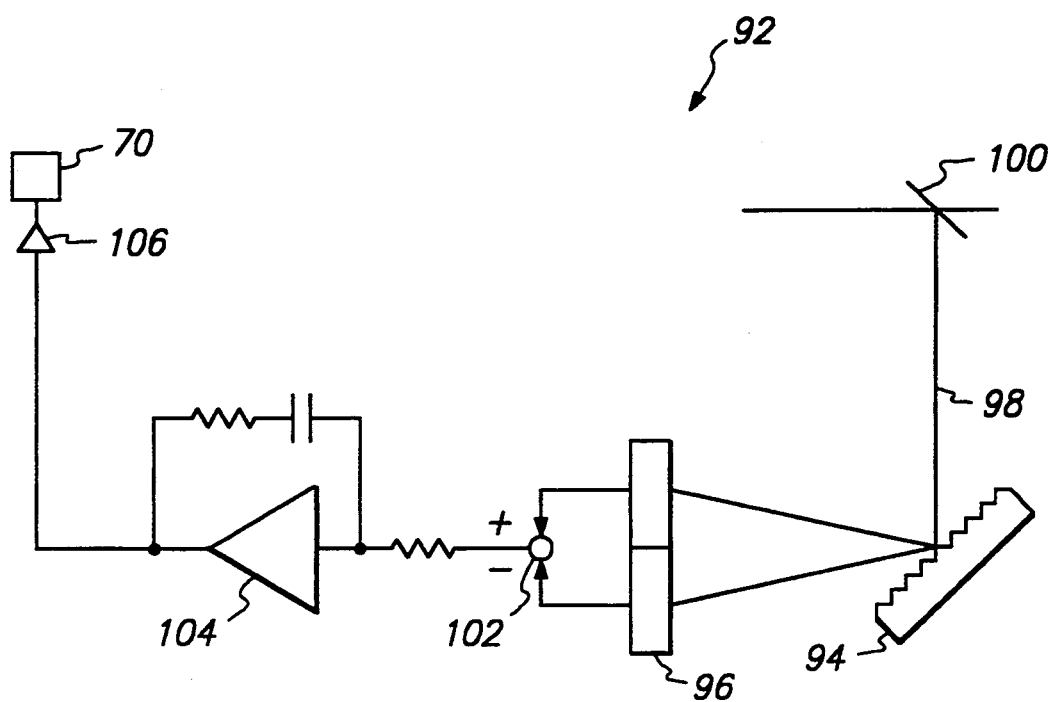
FIG. 7 is a block diagram of a second embodiment of a cavity-length servo control for the OPO of the present invention.

Referring now to FIG. 7, a cavity-length servo system 92 including diffraction grating 94 and bi-cell detector 96 may be employed in an alternate embodiment. A portion 98 of the OPO output signal is directed to diffraction grating 94 by a beam splitter 100. The diffraction grating 94 is set at an angle to select the desired wavelength. The spread out portion of the spectrum containing the OPO output frequency at its center is projected on the bi-cell detector 96, which may comprise a well-known quad cell having two pairs of adjacent segments wired together. The signals from the two halves of the bi-cell detector 96 are subtracted from one another in subtractor circuit 102. The error signal output of the subtractor circuit is amplified by amplifier 104, used to drive a servo amplifier 106 which, in turn drives the piezoelectric transducer 70. The servo loop acts to minimize the error signal, thus centering the desired wavelength on the bi-cell detector 96. This method is functional but suffers from the drawback that it will stabilize the wavelength but will not stabilize the output power. Utilizing a combination of the servo methods disclosed with reference to FIGS. 6 and 7 is contemplated to produce an embodiment of the present invention in which both output power and wavelength may be stabilized.

Unlike a laser system which can be aligned using the fluorescence from the pumped gain media to align the cavity, the level of optical parametric fluorescence is many orders of magnitude smaller. To compound the alignment difficulty, the length of the OPO cavity must match the pump laser cavity length to within a few microns or the OPO will not oscillate. The alignment procedure for the prior-art angle tuned KTP OPO involves first bringing the pump beam into the nonlinear crystal at 5° off axis (due to the walkoff), followed by prealigning the cavity with a 1.3 $\mu$m laser diode and then looking for the fluorescence with a cooled Germanium detector and a lock-in amplifier.

The alignment procedure for 90° phase matched LBO in the OPO of the present invention is far simpler. The optical cavity length of the pump laser 28 can be determined using a detector and frequency counter and the optical cavity length of the OPO may be physically set to the same value to an accuracy of typically about 1 mm. The LBO crystal is then aligned at Brewster's angle by rotating the polarization of the pump beam by 90° and looking for the minimum reflected power from the crystal surfaces. The first pinhole 108 is then aligned onto the pump beam and the output coupler 18 is aligned to return the pump beam through the pinhole 108. To facilitate this, the pump laser may be tuned to a wavelength where mirrors 14 and 16 are at least 20% reflective. This gives a larger pump beam intensity for alignment of pinhole 110 in the rear of the cavity. Since there is no walkoff in the 90° phase matched LBO the pump beam and the OPO beam will be substantially collinear. The high reflector 12 is aligned to pass the pump beam back through pinhole 110. Finally the length of the cavity is varied slightly to get an exact match to the pump laser. If the pump laser is later moved, then the new pump beam need only be directed through the pinholes 108 and 110 in order to realign the OPO.

According to an alternate alignment procedure, a Nd:YAG crystal is first substituted for the LBO crystal. If a Brewster cut LBO crystal is used, the Nd:YAG crystal is also Brewster cut. The optimal thickness for the Nd:YAG crystal is such that the beam is displaced the same distance laterally as in the LBO crystal as shown in FIG. 1. The cavity is then aligned and the Nd:YAG is made to lase. The cavity length is determined by examining the output of this cavity on a diode and spectrum analyzer. The noise will show a beat at a frequency of C/2L where C is the speed of light and L is the cavity length. The true optical cavity length may thus be determined to within a few microns. The cavity length of the pump laser may also be determined with the diode and spectrum analyzer, and the two cavities can then be accurately matched. Pinhole 108 is placed on the pump beam for later reference as shown in FIG. 1. An external curved mirror 112 placed behind curved mirror 16 is used to send the pump beam back on itself and pinhole 110 is placed on the pump beam in the rear of the cavity. The Nd:YAG crystal is then replaced by the LBO crystal which is aligned so that the pump beam passes through both pinholes 108 and 110. Finally, mirrors 18 and 12 are aligned to pass the pump beam back through pinholes 108 and 110 respectively.

To obtain the shortest pulses from the OPO, the group delay dispersion must be controlled. The optimal group delay dispersion (GDD) is zero or slightly negative to compensate self phase modulation (SPM) in the crystal. For the KTP OPO this negative dispersion is generated by placing a pair of prisms in the cavity as is well known in the art. This adds complexity to the OPO and as the laser is tuned the dispersion must be adjusted and then the cavity length must be readjusted. This optimization must be done every time the OPO is tuned. If the prisms are omitted the pulse width will broaden significantly and the pulse quality will suffer. This procedure is at best cumbersome.

It has been found by the present inventors that the GDD of LBO crosses zero at about 1.2 $\mu$m. As previously noted, the group delay time as a function of wavelength is shown in FIG. 5. The calculated value for zero GDD is shown as 1.19 $\mu$m. This is the lowest wavelength of any suitable nonlinear crystal. As a result, clean ultra-short pulses can be produced near this wavelength in the LBO OPO even without prisms. Pulses as short as 40 femtosecond with typical pulse widths of 60 femtosecond have been observed at a wavelength of 1.3 micrometers. The shortest pulses observed with a KTP OPO at the same wavelength are 57 femtosecond with prisms in the cavity. As the LBO OPO is tuned to longer wavelengths such as 1.5 $\mu$m, the GDD becomes more negative and the pulses broaden. For example, the inventors have found that, at a wavelength of 1.48 microns, the pulsewidth broadens to 100 femtosecond. Other materials such as the glass SF-10, have their zero GDD wavelength at wavelengths as long as 1.7 $\mu$m. By inserting a compensating plate of SF-10 of a few mm thickness in the cavity, the GDD in the OPO may be reduced to an arbitrarily small value. The total GDD will just be the sum of the GDD of the crystal and the compensator plate. The required small negative GDD value can be obtained in the region between 1.3 and 1.7 $\mu$m using this technique and avoiding the complication of a prism pair. For wavelengths shorter than 1.3 micrometers, intracavity prism pairs will probably be necessary. For example, the inventors have found that, at a wavelength of 1.48 microns, the pulsewidth can be reduced to 53 femtoseconds using a 6 mm plate of SF-10.

The ideal situation would be to be able to vary the length of glass in the cavity without changing the total optical path length. In this way, the GDD could be varied without sacrificing the synchronous pumping condition. According to another aspect of the present invention, the high reflective mirror 12 is replaced by a Littrow prism. The front face of the prism is a Brewster surface and the rear face is coated as a high reflector. When the prism is translated parallel to its high reflecting face, the amount of glass inserted into the beam path is varied while maintaining the overall cavity length. If an intracavity prism pair is employed, the second prism may be translated at the appropriate angle (not perpendicular to the base of the prism as is done in prior art systems) to obtain the same goal of varying the GDD without changing the optical path length.

The synchronously pumped subpicosecond OPO is similar to a synchronously pumped dye laser in many ways. As such many of the enhancements added to the dye laser systems are also applicable to the OPO's. Most notable is the cavity dumper. Using an acousto-optic modulator similar to those designed for dye lasers, the repetition rate of the OPO can be reduced and the output pulse energy can be increased by more than an order of magnitude. In addition both intracavity and extracavity frequency doubling and difference frequency mixing are possible.

In addition, the inventors have observed that the OPO does not tune between the wavelengths of 1.35 and 1.42 microns. Furthermore, the output power is greatly reduced between the wavelengths of 1.1 and 1.2 microns. The inventors have found that the cause of this tuning discontinuity is absorption due to water in the atmosphere. By sealing and purging the cavity using conventional purging and sealing techniques, it has been demonstrated that a 50% increase in power may be obtained in the region between the wavelengths of 1.1 and 1.2 microns. It is also believed that the OPO can be made to operate throughout this entire wavelength range.

According to a second embodiment of the present invention, a picosecond mode-locked Ti:Sapphire laser is used as the pump source for the OPO described herein. The present inventors have discovered that, using 2.6 watts of 770 nm pump pulses having durations between about 1 and 2 picoseconds, picosecond output pulses at a power of 300 mW are generated. The temperature tuned LBO crystal used was 6 mm in length as previously described herein.

According to a third embodiment of the present invention which is a variation of the preferred embodiment herein, a cw mode-locked Nd:YAG or Nd:YLF laser, which is preferable diode pumped, is used as the pump source. This laser is frequency doubled to provide pump pulses at 532 or 524 nm. These pump sources are robust and compact but always produce pulses larger than 1 picosecond. Such a source was used by A. Robertson et al. and produced 2.8 picosecond green pump pulses. Robertson et al. pumped a temperature tuned LBO OPO but did not measure the output pulse duration. The authors assume that they have generated 10 picosecond pulses and teach that the use of shorter pump pulses generated through pulse compression should also enable the continuous generation of broadly tunable femtosecond pulses.

The present inventors have discovered that, using 4 picosecond pump pulses at 532 nm, 3 picosecond signal pulses near 800 nm may be generated from an LBO OPO using a 6 mm crystal. Due to the dispersion of the crystal and the synchronous pumping condition, these pulses are substantially linearly chirped. Using an extra-cavity prism pair, these 3 picosecond pulses are compressed to 200 femtosecond. A prism pair inserted into the cavity reduces the positive GDD and the bandwidth of the 3 picosecond pulses is substantially increased. The sensitivity to cavity length fluctuations, however, become quite severe. Thus using a length servo as described above in concert with both intracavity and extracavity dispersion compensation, it is anticipated that pulses substantially shorter than 200 femtosecond can be generated.

The concept of generating subpicosecond pulses from an OPO pumped by picosecond pulses is novel. In all OPO's to date the output pulse has been comparable to the pump pulse or longer in duration. The only previous case was R. Laener et al. *Opt. Lett.* 15, 971 (1990), who used 800 femtosecond Q-switched mode locked pump pulses and generated 60 femtosecond output pulses. These pulses were only generated at a single wavelength and were idler pulses not signal pulses. The authors of this prior art article did not appreciate how to extend these short pulses to other wavelengths or to the signal pulses. They did not suggest using either intra or extra cavity dispersion compensation. They attributed the result to a fortuitous combination of crystal dispersion and signal and idler wavelengths.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A synchronously pumped, optical parametric oscillator comprising:
   means for defining a cavity with an optical path therethrough;
   an LBO crystal disposed in said optical path in said cavity at a beam waist position thereof;
   a cw mode locked Ti:Sapphire pump source oriented to supply pump pulses to said LBO crystal;
   said cavity having a length selected to produce a synchronous pumping condition;
   means for controlling the temperature of said LBO crystal to within at least about 2° C.

2. The synchronously pumped, optical parametric oscillator of claim 1 wherein said crystal has a length of between about 2 mm and 15 mm.

3. The synchronously pumped, optical parametric oscillator of claim 1 wherein said crystal has a length of between about 4 mm and 6 mm.

4. The synchronously pumped, optical parametric oscillator of claim 1 wherein opposing faces of said crystal in said optical path are cut at Brewster's angle.

5. The synchronously pumped, optical parametric oscillator of claim 1 wherein said LBO crystal is 90° phase matched.

6. The synchronously pumped, optical parametric oscillator of claim 1 wherein said LBO crystal is cut such that $\nu = 90°$ and is less than 15°.

7. The synchronously pumped, optical parametric oscillator of claim 1 further including servo means for adjusting the length of said cavity so as to maintain a synchronous pumping condition.

8. A synchronously pumped, temperature-tuned 90° phase matched LBO crystal optical parametric oscillator comprising:
   a cavity including an optical path therethrough, said cavity defined by an high reflector, an output coupler and first and second curved mirrors, a first leg of said cavity defined between said high reflector and said first curved mirror and having a first length, a second leg of said cavity defined between said and first and second curved mirrors and having a second length, and a third leg of said cavity defined between said second curved mirror and said output coupler and having a third length;
   an LBO crystal disposed in said optical path in said second leg of said cavity at a beam waist position thereof;
   a cw mode locked Ti:Sapphire pump source oriented to supply pump pulses to said LBO crystal;
   said first, second, and third lengths selected to produce a synchronous pumping condition;
   means for controlling the temperature of said LBO crystal to within at least about 2° C.

9. A synchronously pumped, optical parametric oscillator comprising:
   means for defining a cavity with an optical path therethrough;
   an LBO crystal disposed in said optical path in said cavity at a beam waist position thereof;
   a cw mode locked Nd doped, frequency doubled, pump source oriented to supply pump pulses to said LBO crystal, said pump pulses having a duration greater than 1 picosecond;
   said cavity having a length selected to produce a synchronous pumping condition;
   means for controlling the temperature of said LBO crystal to within at least about 2° C.; and
   dispersion compensation means, located outside of said cavity, for compensating a chirp on an output pulse from said optical parametric oscillator to obtain a pulsewidth of said output pulse of less than 1 picosecond.

10. The synchronously pumped, optical parametric oscillator of claim 9 wherein said crystal has a length of between about 2 mm and 15 mm.

11. The synchronously pumped, optical parametric oscillator of claim 9 wherein opposing faces of said crystal in said optical path are cut at Brewster's angle.

12. The synchronously pumped, optical parametric oscillator of claim 9 further including dispersion compensation means, located inside of said cavity, for increasing the bandwidth of a chirped output pulse from said optical parametric oscillator.

13. The synchronously pumped, optical parametric oscillator of claim 9 further including servo means for adjusting the length of said cavity so as to maintain a synchronous pumping condition.

* * * * *